United States Patent
Yudanov

(10) Patent No.: US 9,695,790 B2
(45) Date of Patent: Jul. 4, 2017

(54) HYDRAULIC SYSTEM

(71) Applicant: VOLVO TRUCK CORPORATION, Göteborg (SE)

(72) Inventor: Sergi Yudanov, Västra Frölunda (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/897,117

(22) PCT Filed: Jul. 1, 2013

(86) PCT No.: PCT/EP2013/001915
§ 371 (c)(1),
(2) Date: Dec. 9, 2015

(87) PCT Pub. No.: WO2015/000493
PCT Pub. Date: Jan. 8, 2015

(65) Prior Publication Data
US 2016/0123290 A1    May 5, 2016

(51) Int. Cl.
*F02M 63/02* (2006.01)
*F02M 63/00* (2006.01)
(Continued)

(52) U.S. Cl.
CPC .... *F02M 63/0225* (2013.01); *F02M 37/0052* (2013.01); *F02M 63/005* (2013.01);
(Continued)

(58) Field of Classification Search
CPC ............... F02M 63/00; F02M 63/0005; F02M 63/0007; F02M 63/005; F02M 63/0052;
(Continued)

(56) References Cited

U.S. PATENT DOCUMENTS 5,697,341 A * 12/1997 Ausman ............... F02M 57/025
123/446
5,713,520 A * 2/1998 Glassey ............... F02M 47/027
239/124
(Continued)

FOREIGN PATENT DOCUMENTS

DE          43 36 061 A1    9/1995
DE          10128283 A1    1/2003
(Continued)

OTHER PUBLICATIONS

International Search Report (Mar. 4, 2014) for corresponding International App. PCT/EP2013/001915.
(Continued)

*Primary Examiner* — John Kwon
*Assistant Examiner* — Johnny H Hoang
(74) *Attorney, Agent, or Firm* — WRB-IP LLP

(57) ABSTRACT

A hydraulic system includes a high pressure fluid source and a hydraulic actuator fluidly connected to the high pressure fluid source, and a low pressure fluid system fluidly connected to the hydraulic actuator via a fluid return line, and a hydraulic valve. The hydraulic valve includes a return spring and an elongate member, which is movably arranged in its longitudinal direction for controlling a fluid flow. The elongate member is biased to a closed position by the return spring. The elongate member forms a needle, the hydraulic valve includes a needle receiving body having a needle seat and the needle is engageable with the needle seat so as to control the fluid flow.

31 Claims, 9 Drawing Sheets

(51) Int. Cl.
*F02M 37/00* (2006.01)
*F16K 17/04* (2006.01)

(52) U.S. Cl.
CPC .... *F02M 63/0005* (2013.01); *F02M 63/0007* (2013.01); *F02M 63/0054* (2013.01); *F16K 17/04* (2013.01); *F02M 2200/953* (2013.01)

(58) Field of Classification Search
CPC ........... F02M 63/0054; F02M 63/0225; F02M 2200/953; F16K 17/04
USPC ........ 123/445, 473, 478, 495; 701/103, 104; 239/88–92
See application file for complete search history.

(56) References Cited

U.S. PATENT DOCUMENTS

| | | | | |
|---|---|---|---|---|
| 5,785,021 A | * | 7/1998 | Yudanov | F02M 57/025 123/446 |
| 6,161,773 A | * | 12/2000 | Camplin | F02M 45/12 239/533.4 |
| 6,298,833 B1 | * | 10/2001 | Douville | F02D 19/0684 123/27 GE |
| 2002/0053340 A1 | * | 5/2002 | Lei | F02M 45/04 123/446 |
| 2004/0134465 A1 | * | 7/2004 | Boltz | F02B 1/12 123/446 |
| 2006/0236974 A1 | * | 10/2006 | Randall | F02M 53/08 123/299 |
| 2008/0308064 A1 | * | 12/2008 | Yudanov | F02M 45/02 123/296 |
| 2011/0174270 A1 | | 7/2011 | Harhoff et al. | |

FOREIGN PATENT DOCUMENTS

| | | |
|---|---|---|
| DE | 102 27 011 A1 | 1/2004 |
| DE | 102009032850 A1 | 1/2011 |
| DE | 102010049022 A1 | 9/2012 |
| GB | 2 495 140 A | 4/2013 |
| WO | 2009110820 A1 | 9/2009 |

OTHER PUBLICATIONS

International Preliminary Report on Patentability (Nov. 2, 2015) for corresponding International App. PCT/EP2013/001915.

* cited by examiner

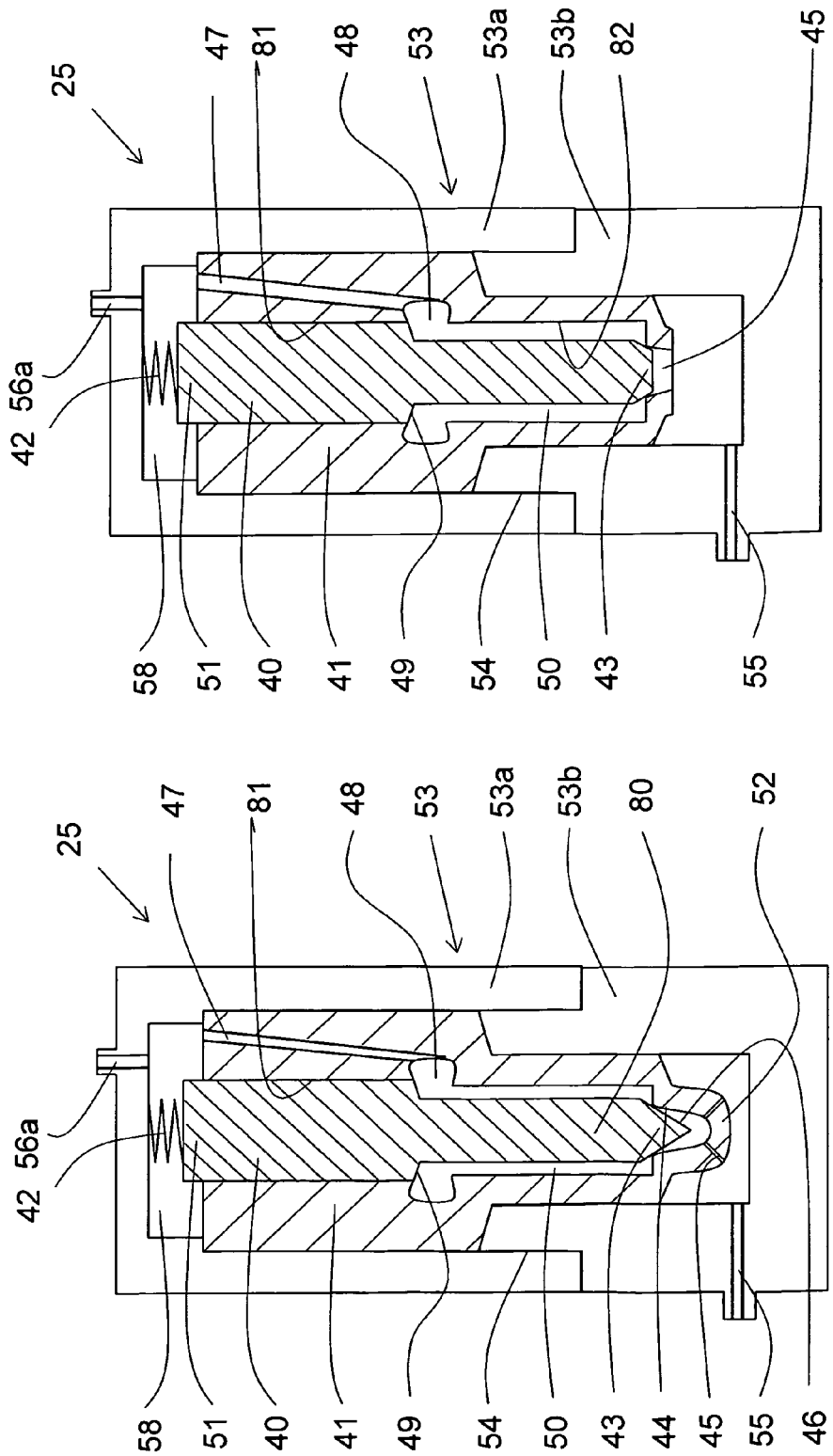

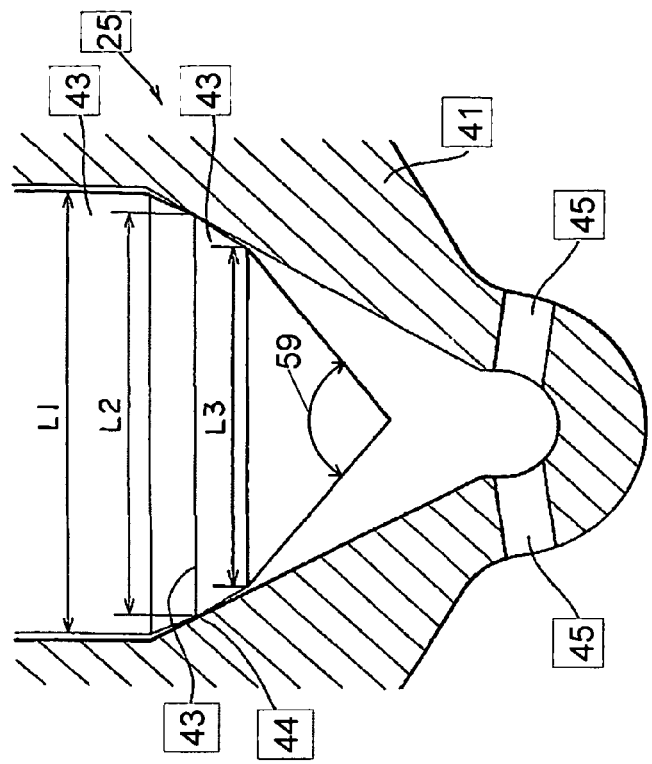
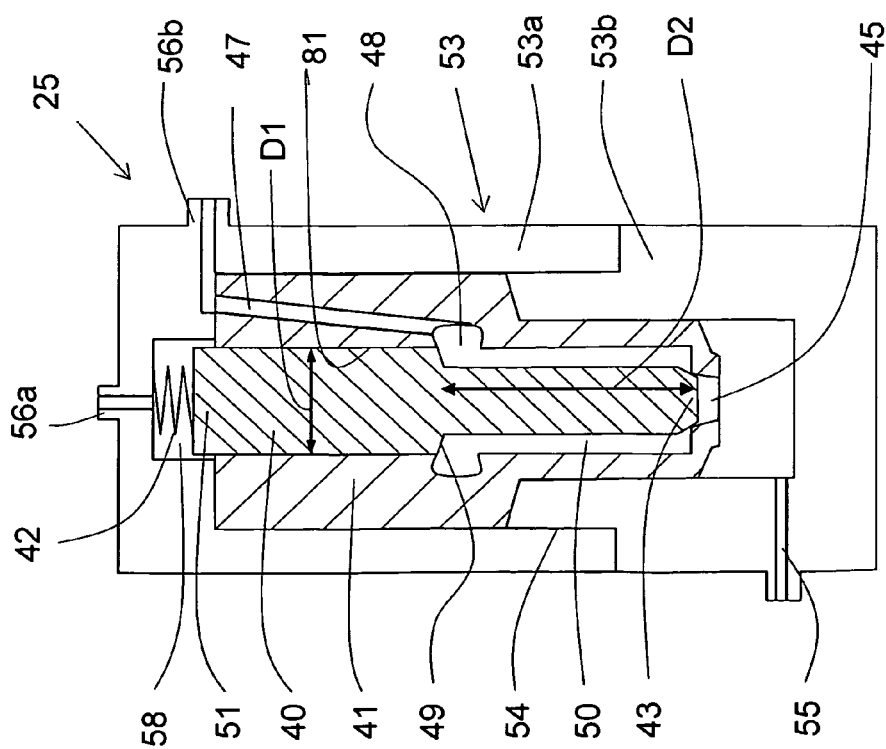
Fig. 11
Fig. 10

HYDRAULIC SYSTEM

BACKGROUND AND SUMMARY

This disclosure relates to a hydraulic system comprising a high pressure fluid source and a hydraulic actuator fluidly connected to the high pressure fluid source, and a low pressure fluid system fluidly connected to the hydraulic actuator via a fluid return line, and a hydraulic valve, wherein the hydraulic valve comprises a return spring and an elongate member, which is movably arranged in its longitudinal direction for controlling a fluid flow, and wherein the elongate member is biased to a closed position by means of the return spring. The hydraulic system is particularly suitable in a fuel injection system for supplying low-viscosity fuel, such as dimethyl ether (DME), a combustion engine. However, the hydraulic system may alternatively be implemented in various other types of applications, for example in various sorts of mobile hydraulic systems, such as for example hydraulic systems in heavy trucks, construction vehicles, busses, marine vehicles, etc.

Leakage of fluid is a general problem in hydraulic systems, such as for example leakage of fuel past a hydraulic valve in a fuel injection system, in particular when using low-viscosity fuel such as dimethyl ether (DME). It is for example known from WO2009/110820 to provide the fuel injection system with automatic isolating valves at selected locations throughout the fuel injection system, to provide a small check valve at the outlet of each injector, as well as provide a pressure regulator in the return line. These solutions however have problems in terms of long-term sealing reliability, as well as high system cost. There is thus a need for an improved hydraulic system removing the above mentioned disadvantage.

It is desirable to provide a hydraulic system where the previously mentioned problem is at least partly avoided.

The invention concerns, according to an aspect thereof, a hydraulic system comprising a high pressure fluid source and a hydraulic actuator fluidly connected to the high pressure fluid source, and a low pressure fluid system fluidly connected to the hydraulic actuator via a fluid return line, and a hydraulic valve, wherein the hydraulic valve comprises a return spring and an elongate member, which is movably arranged in its longitudinal direction for controlling a fluid flow, and wherein the elongate member is biased to a closed position by means of the return spring.

The invention is characterized in that the elongate member forms a needle, that the hydraulic valve comprises needle receiving body having a needle seat and that the needle is engageable with the needle seat so as to control the fluid flow.

Providing a hydraulic, valve with a needle and an associated needle receiving body having a needle seat enables manufacturing of a very wear-resistant valve with a very reliable long term sealing performance. In particular if the needle and needle receiving body are manufactured with tolerances and material qualities similar to those of a nozzle needle and nozzle body of a conventional diesel fuel injection nozzle, an inexpensive high performance hydraulic valve can be manufactured that may be used in many different configurations for different types of fluid flow control, such as pressure-relief valve, pressure regulating valve, pressure-isolating valve or non-return valve in a hydraulic system. Standard diesel nozzles are generally extremely precisely manufactured valves with very hard wear-resistant seats. Consequently, the solution according to the disclosure enables simplification and cost reduction of a hydraulic system and improved sealing durability and reliability.

Further advantages are achieved by implementing one or several of the features of the dependent claims.

According to an aspect of the invention, the hydraulic system is a fuel injection system for an internal combustion engine having at least one combustion cylinder, wherein the actuator is a fuel injector having a fuel injection nozzle for injecting fuel into the combustion cylinder, wherein the low pressure fuel system comprises a fuel tank, and wherein the needle is engageable with the needle seat so as to control the fuel flow. The hydraulic valve according to the disclosure is advantageous for use in hydraulic system having relatively small fluid flow volumes, such as for example fuel injection systems. In particular low-viscosity fuel injection systems can advantageously use the hydraulic valve due to the long term high performance sealing capacity providable by the hydraulic valve according to the disclosure.

According to an aspect of the invention, engaging surfaces of the needle and the needle seat are conically shaped. This increases the sealing performance, reliability and durability over time since the sealing surfaces automatically can adopt to wear of the surfaces.

According to an aspect of the invention, the needle comprises at least one thrust surface configured to be subjected to a fluid pressure for urging the needle away from the needle seat. The pressure of the fluid at the thrust surface of the needle generates a force for urging the hydraulic valve to an open state.

According to an aspect of the invention, engaging surfaces of the needle and the needle seat comprises metal for a metal to metal contact in the closed position of the hydraulic valve. Moreover, the needle seat is free from any additional soft sealing ring. Similar to above, this increases the sealing performance reliability and durability over time According to an aspect of the invention, the needle receiving body comprises an internal bore forming a cylindrical guide for axially guiding the needle within the needle receiving body, wherein the cylindrical guide is located at a distance from the needle seat, and wherein an outlet chamber is provided between the needle seat and the cylindrical guide. The guide enables a very precise longitudinal motion of the needle within the needle receiving body, thereby reducing the wear on the needle and needle seat due to reduction of the freedom of motion of the needle. The position of the outlet chamber between the needle seat and the cylindrical guide is the result of the conventional use of the needle and needle receiving body as fuel injection nozzle, because the owlet chamber is then used a high pressure fuel receiving chamber where the fuel may urge the needle towards an open position be acting on a thrust surface of the fuel receiving chamber. The outlet chamber thus also comprises a thrust surface of the needle.

According to an aspect of the invention, the cylindrical guide forms part of a needle chamber, which is located on the side of the cylindrical guide opposite to the outlet chamber. The needle chamber may be fluidly connected to the outlet chamber or not, thereby enabling configuration of the hydraulic valve according to the specific requirements of each unique application. The fluid pressure within the outlet chamber urges the needle towards an open position and the fluid pressure within the needle valve urges the needle to a closed position, and the cylindrical guide is preferably provided with a certain level, of sealing performance for avoiding fluid leakage past the cylindrical guide. The diametric clearance between the cylindrical guide and needle is preferably less than five micrometers for accomplishing said certain level of sealing performance along the cylindrical guide. Furthermore, an additional seal can be provided along the cylindrical guide for further enhancing the sealing performance along the cylindrical guide.

According to an aspect of the invention, the diameter of the cylindrical guide is larger than the diameter of the nozzle seat.

According to an aspect of the invention, the needle receiving body comprises a single hole having a diameter greater than 1 mm upstream of the needle seat. This size enables a sufficiently large fluid flow in certain flow control applications where the standard injection holes located on the tip of the fuel injection nozzle body is too restrictive.

According to an aspect of the invention, a truncation diameter of a tip of the needle is greater than 85% of a seat diameter.

According to an aspect of the invention, a truncation angle of a tip of the needle is greater than 140 degrees. This enables a relatively large fluid flow in an open state of the needle. A more pointed tip of the needle reduces the available flow area through the needle seat.

According to an aspect of the invention, the shortest distance between the cylindrical guide and the needle seat is at least ten times the needle seat diameter. This proportion illustrates the significant length versus diameter of the needle and needle receiving body, which proportion is required when using the hydraulic valve as a conventional fuel injector.

According to an aspect of the invention, the needle and needle receiving body are parts of a fuel injection nozzle, wherein the needle is a nozzle needle and the needle receiving body is the nozzle body. Various modifications may be made to the fuel injection nozzle to make the needle and needle receiving body better suitable for the new use, such as increasing the flow area through the needle receiving body to the tip of the needle valve, increasing the flow area along the flow passage between the needle tip and outlet chamber, flatten the tip of the needle to enable an increased flow area through the needle seat in an open state of the hydraulic valve. Using parts of a conventional diesel fuel injection nozzle for constructing a hydraulic valve provides the valve with very long term high performance sealing capacity against fluid leakage, in particular low-viscosity fuel, such as dimethyl ether (DME). This is possible because a diesel fuel injection nozzle is an extremely precisely manufactured valve with very hard wear-resistant seats.

According to an aspect of the invention, the fuel injection nozzle comprises an inlet, an outlet, and the fuel injection nozzle is fluidly connected such that the pressure of the fluid supplied via the inlet of the fuel injection nozzle to the tip of the needle urges the needle away from the needle seat to open the fuel injection nozzle.

According to an aspect of the invention, the hydraulic valve comprises a valve housing for receiving the needle and needle receiving body. The valve housing enables fuel to be conveyed via suitable fluid ports of the housing to the appropriate regions of the needle and needle receiving body. The housing is preferably made of metal, such as steel, or other types of material such as plastic. The housing preferably comprises at least two main parts that are configured to enclose the needle and needle receiving body. The housing may even be integrated with a housing of the actuator to form a common housing containing both the actuator and the hydraulic valve.

According to an aspect of the invention, the valve housing preferably comprises a fuel inlet configured to supply relatively high pressure fluid to the contact region of the needle and needle seat for urging the needle away from the needle seat.

According to an aspect of the invention, the hydraulic valve comprises a fluid outlet fluidly connected to the outlet chamber and/or a fluid outlet fluidly connected to the needle chamber.

According to an aspect of the invention, the inlet of the hydraulic valve is connected to the high pressure fluid source and the outlet of the hydraulic valve is connected upstream of the actuator for preventing backflow of fluid towards the high pressure fluid source. The hydraulic valve prevents backflow during time periods where the high pressure fluid source is disabled or for other reasons does not supply high pressure fluid.

According to an aspect of the invention, the inlet of the hydraulic valve is connected upstream of the actuator and the outlet of the hydraulic valve to the return line or the low pressure fluid system for limiting the pressure of the fluid supplied to the actuator. The hydraulic valve function here as a pressure relief valve that protects the actuator from harmful over pressures.

According to an aspect of the invention, the inlet of the hydraulic valve is connected to the outlet of the actuator and the outlet of the hydraulic valve is connected to the return line or the low pressure fluid system for regulating the operating pressure upstream of the hydraulic valve and/or preventing backflow of fluid towards the actuator.

According to an aspect of the invention, the needle chamber is connected to atmosphere. The air within the needle chamber may thus easily be pushed out of the needle chamber in case of opening of the hydraulic valve, such that the fluid in the needle chamber does not act as resistance against the opening motion of the needle. This arrangement requires good sealing performance along the cylindrical guide to avoid fluid leakage out from the hydraulic valve along the cylindrical guide.

According to an aspect of the invention, the needle chamber is connected to the low pressure fluid system. The current pressure of the low pressure fluid system will thus act on a thrust surface of the needle in the needle chamber for urging the needle to a closed position in conjunction with the return spring. Thus configuration of the hydraulic valve thus results in different opening characteristic than where the needle chamber is coupled to atmosphere.

BRIEF DESCRIPTION OF DRAWINGS

In the detailed description of the invention given below reference is made to the following figure, in which:

FIG. 8 shows an embodiment of a hydraulic valve according to the disclosure, FIG. 9 shows another embodiment of a hydraulic valve according to the disclosure, FIG. 10 shows still another embodiment of a hydraulic valve according to the disclosure, and FIG. 11 shows a tip portion of a needle and body according to the disclosure.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
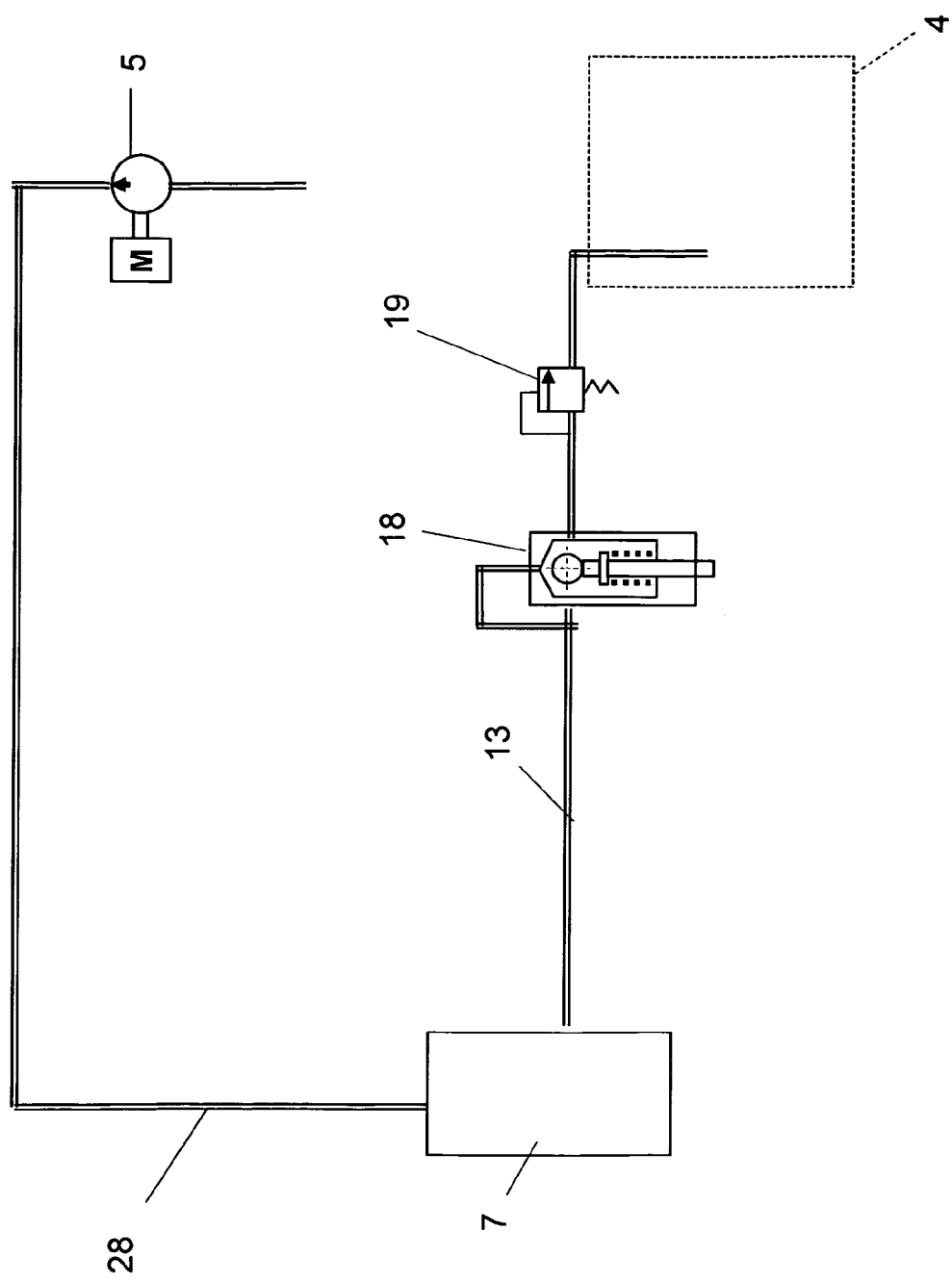
FIG. 1 shows a prior art hydraulic system.

FIG. 1 shows schematically a simplified prior art hydraulic system. The hydraulic system comprises a high pressure fluid source 5 arranged for supplying relatively high pressure fluid to a hydraulic actuator 7 via a fluid supply line 28. Fluid exiting the actuator 7 may return to a low pressure fluid system 4 via a fluid return line 13. In certain hydraulic installations additional fluid flow control is required to enable for example additional leakage preventing means. The risk of leakage is more likely to develop in use of low-viscosity fluids, where it also carries more undesirable consequences because of potential use of pressurised tanks for keeping the low-viscosity fluid in a liquid phase. The problem occurs for example in fuel injection systems. For this purpose, an automatic pressure-isolating valve 18 with resilient seat may be provided in the return line 13, as for example known from WO 2009/110820. The automatic pressure-isolating valve 18 prevents fuel from leaking from the low pressure fluid system 4 to a hydraulic actuator 7, such as a fuel injector, when the engine is not working. The resilient-seated pressure-isolating valves 18 can be designed for gas-tight seal but must be protected against too high contact pressure and cyclic wear in the seat, so they are usually designed to be fully open all of the time when engine is running by setting relatively low opening pressure. Additionally, certain hydraulic actuators, such as fuel injectors, need to have the fluid pressure in their return line 13 controlled to above vapour pressure at relatively high engine temperature, usually amounting to about 40 bars. This corresponds for example to 110° C. in the example of using DME as fuel in the fuel injection system, wherein 110° C. corresponds to the usual engine working temperature. Injection stability is ensured by preventing fuel evaporation in the injector through its pressurisation. This is achieved by a separate pressure regulator 19 installed in the return line 13 between the fuel injector and the low pressure fluid system 4. The pressure regulator 19 is in its simplest form a spring-loaded proportional pressure relief valve. The pressure regulator exhibits a high contact pressure during each closing sequence, such that fatigue wear quickly renders the pressure regulator non-tight against fuel and fuel vapour during engine stillstand.

Figure 2:
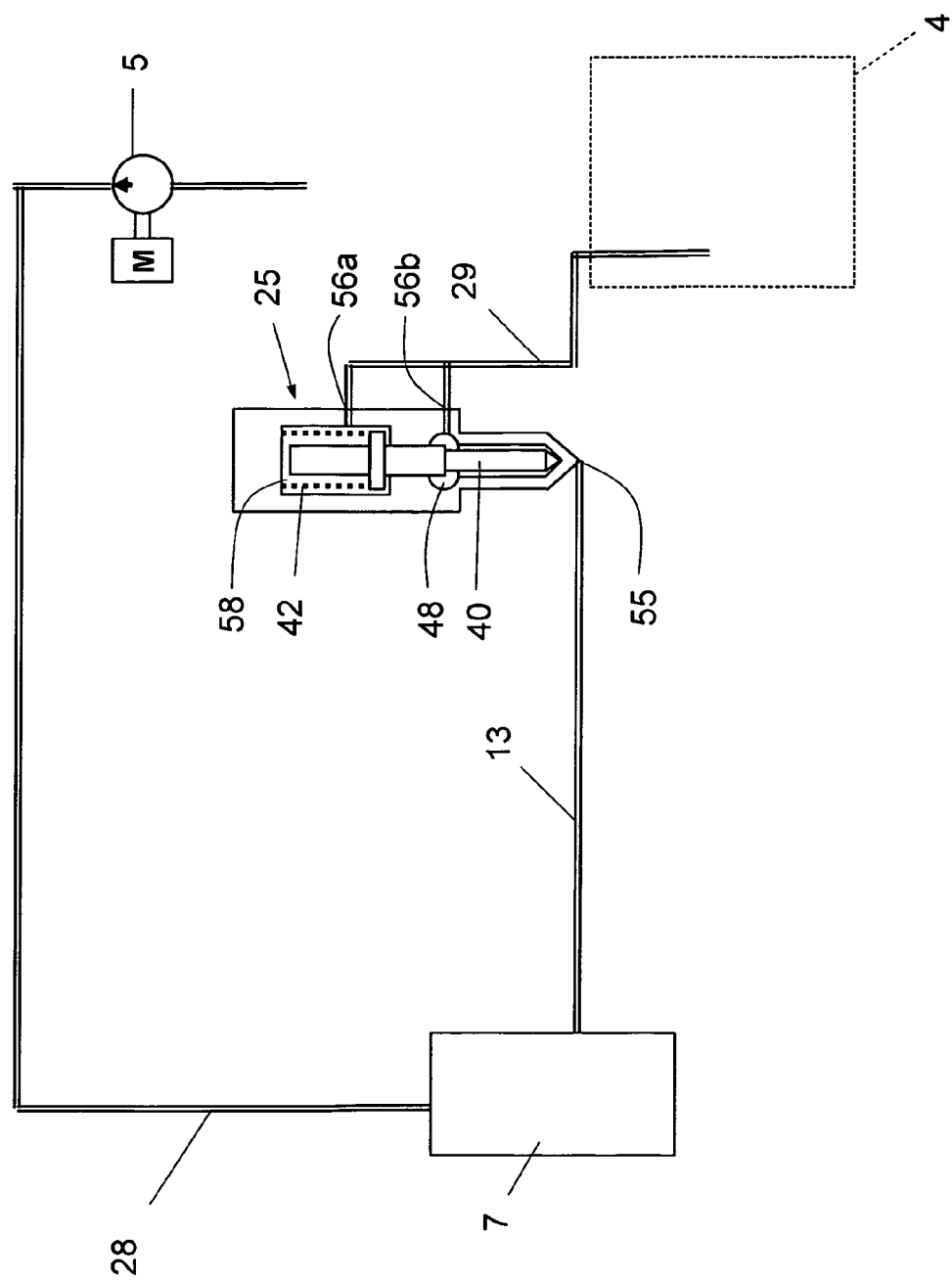
FIG. 2 shows a first aspect of the hydraulic system according to the disclosure.

The solution according to the disclosure is illustrated in FIG. 2, where both the isolating valve 18 and pressure regulator 19 have been replaced by a single hydraulic valve 25. The hydraulic valve 25 is a non-electronically controlled valve located in the return line 13. The hydraulic valve 25 comprises a return spring 42 and an elongate member, which is movably arranged in its longitudinal direction for controlling a fluid flow, and wherein the elongate member is biased to a closed position by means of the return spring 42. The hydraulic valve 25 exhibit superior long-term sealing reliability, as well as low system cost because the elongate member forms at needle 40, because the hydraulic valve 25 comprises needle receiving body having a needle seat, and because the needle 40 is engageable with the needle seat so as to control the fluid flow. The return line 13 is consequently free from an individual pressure isolating valve that is configured to be in an open state during engine operation mode and in a closed state during engine non-operation mode, and an individual pressure regulating valve. The total system cost is consequently reduced.

The hydraulic valve is a standard injection nozzle-based valve. This means that the valve is constructed based on a more or less modified standard diesel fuel injection nozzle. A central aspect of the disclosure is the connection arrangement of the fuel injection nozzle to other parts of the hydraulic system, where the conventional fuel outlet of the fuel injection nozzle here functions as inlet and being connected to receive high pressure fluid, and wherein the conventional fuel inlet here functions as fuel outlet and being connected to the low pressure system. The fuel injection nozzle is consequently arranged in a backward configuration compared with a convention installation as a fuel injector in combustion engine.

By constructing the hydraulic valve 25 based on a more or less modified standard diesel fuel injection nozzle a long-term reliable gas-tight seal is accomplished, and the hydraulic valve 25 can operate both as pressure isolating valve and pressure regulating valve. The hydraulic valve 25 according to FIG. 2 comprises a fluid inlet 56 connected to the actuator 7 and two fluid outlets 56a, 56b, both of which are connected to the low pressure fluid system 4 via a fluid line 29. One fluid outlet 56a is fluidly connected to a needle chamber 58 of the hydraulic valve 25 and the other fluid outlet 56b is fluidly connected to an outlet chamber 48 of the hydraulic valve 25. In this example, both the needle chamber 58 and outlet chamber 48 are referenced to the low pressure fluid system 4 and not to atmospheric pressure as the prior art pressure isolating valve did. Reference to atmospheric pressure means that the opening and closing operating of the valve depends on the surrounding atmospheric pressure, which requires this type of valves to have a sealed guide, such that the needle chamber may be connected with the surrounding, which sealed guide is an inherent risk for leakage. A valve referenced to tank has no such passage to the surrounding, and consequently the risk that fuel leaks out of the hydraulic valve 25 is reduced. During shut down of the hydraulic system of FIG. 2 the hydraulic valve 25 will close and prevent any leakage past the hydraulic valve 25, for example fuel vapour from a pressurised low pressure fluid system to the actuator 7. During operation of the hydraulic system however, the operating pressure of the high pressure fluid source 5 overcomes to opening resistance of the needle 40 to open the hydraulic valve 25.

The conventional fuel injection nozzle is designed to resist very high working pressure and temperature, as well as being partly in contact with highly corrosive gases. Using the needle and needle seat of a standard fuel injection nozzle in the novel position as hydraulic valve in the return line 13 of a hydraulic system most often implies drastically better working conditions, involving no corrosive gases, no extreme temperatures, generally much lower contact pressure in the seat due to lower valve opening pressure, and much lighter duty cycle. Hence the durability of the hydraulic valve will be much longer. Using a needle and needle valve in a hydraulic valve will thus result a simplification of system, cost reduction, durability and reliability improvement and reduction of the risk of external leakage.

Figure 3:
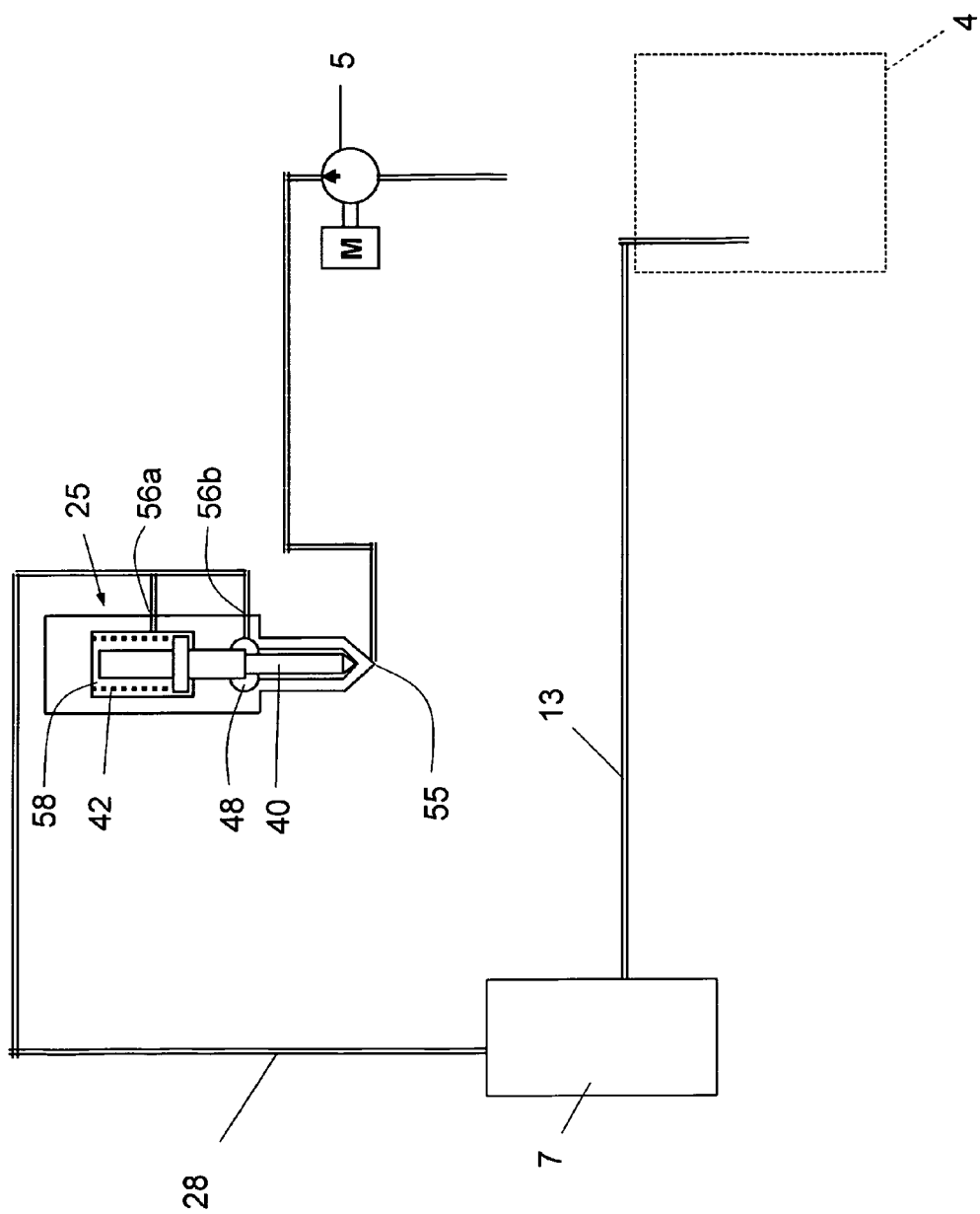
FIG. 3 shows a second aspect of the hydraulic system according to the disclosure.

The hydraulic valve 25 according to disclosure may alternatively be used as a non-return type valve in a hydraulic system. FIG. 3 shows a schematic example of a hydraulic system similar to FIG. 2 but with the hydraulic valve 25 located in the flow path between the high pressure fluid source 5 and hydraulic actuator 7. The fluid inlet 55 of the hydraulic valve 25 is connected to the high pressure fluid source 5 and the two previously described fluid outlets 56a, 56b of the hydraulic, valve 25 are connected to the upstream side of the actuator 7. During shut-down of the hydraulic system the hydraulic valve 25 will close and prevent any leakage flow from the actuator 7 back towards the high pressure fluid source 5 or oppositely. During operation of the hydraulic system however, the operating pressure of the high pressure fluid source 5 overcomes to opening resistance of the needle 40 to open the hydraulic, valve 25.

Figure 4:
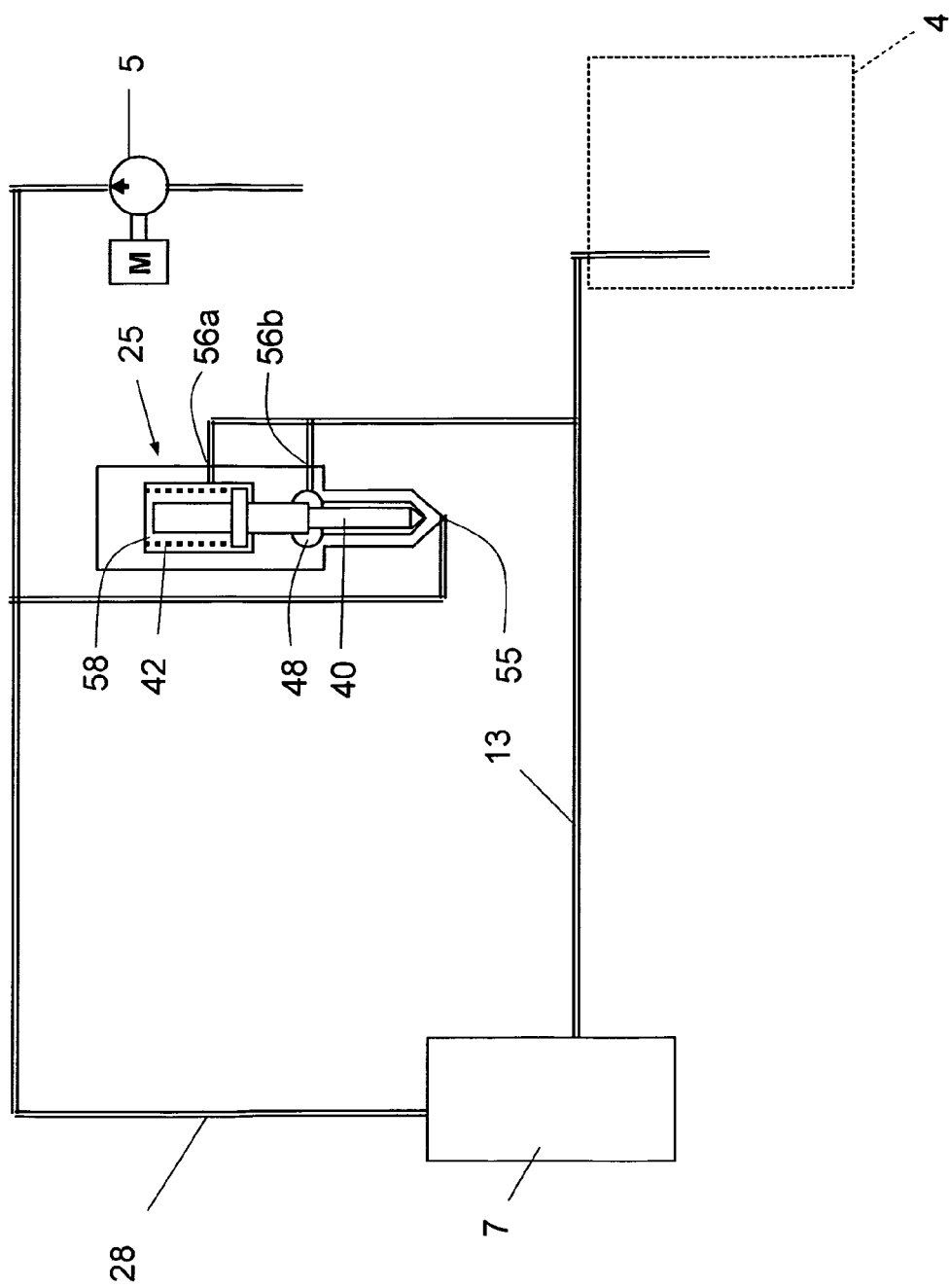
FIG. 4 shows a third aspect of the hydraulic system according to the disclosure.

Yet another application of the hydraulic valve 25 according to the disclosure is implementation as a pressure-relief valve as shown in FIG. 4. The purpose of the hydraulic valve is here thus to protect the actuator from receiving excessive fluid pressure. For this purpose the fluid inlet 55 of the hydraulic valve 25 is connected to the fluid supply line 28 and the two fluid outlets 56a, 56b are connected to the low pressure fluid system 4. In case the high pressure fluid source 5 supplies excessive fluid pressure the operating pressure of the high pressure fluid source 5 overcomes to opening resistance of the needle 40 to open the hydraulic valve 25 for enabling the high pressure fluid to escape directly to the low pressure fluid system 4 without passing the actuator 7. Thereby the actuator 7 is saved from potential damage caused by excessive fluid pressure. In normal operation with normal operating pressure of the high pressure fluid source 5 the needle 40 will not open.

In the exemplary layouts described above in conjunction with FIG. 2-4 the hydraulic valve has consistently be illustrated and described as having two fluid outlets 56a, 56b. However, as will later be described in conjunction with FIGS. 8-10 the hydraulic valve may alternatively be provided with a single fluid outlet, and further alternatively may the two fluid outlets 56a, 56b be connected to different fluid lines of the hydraulic system.

Figure 5:
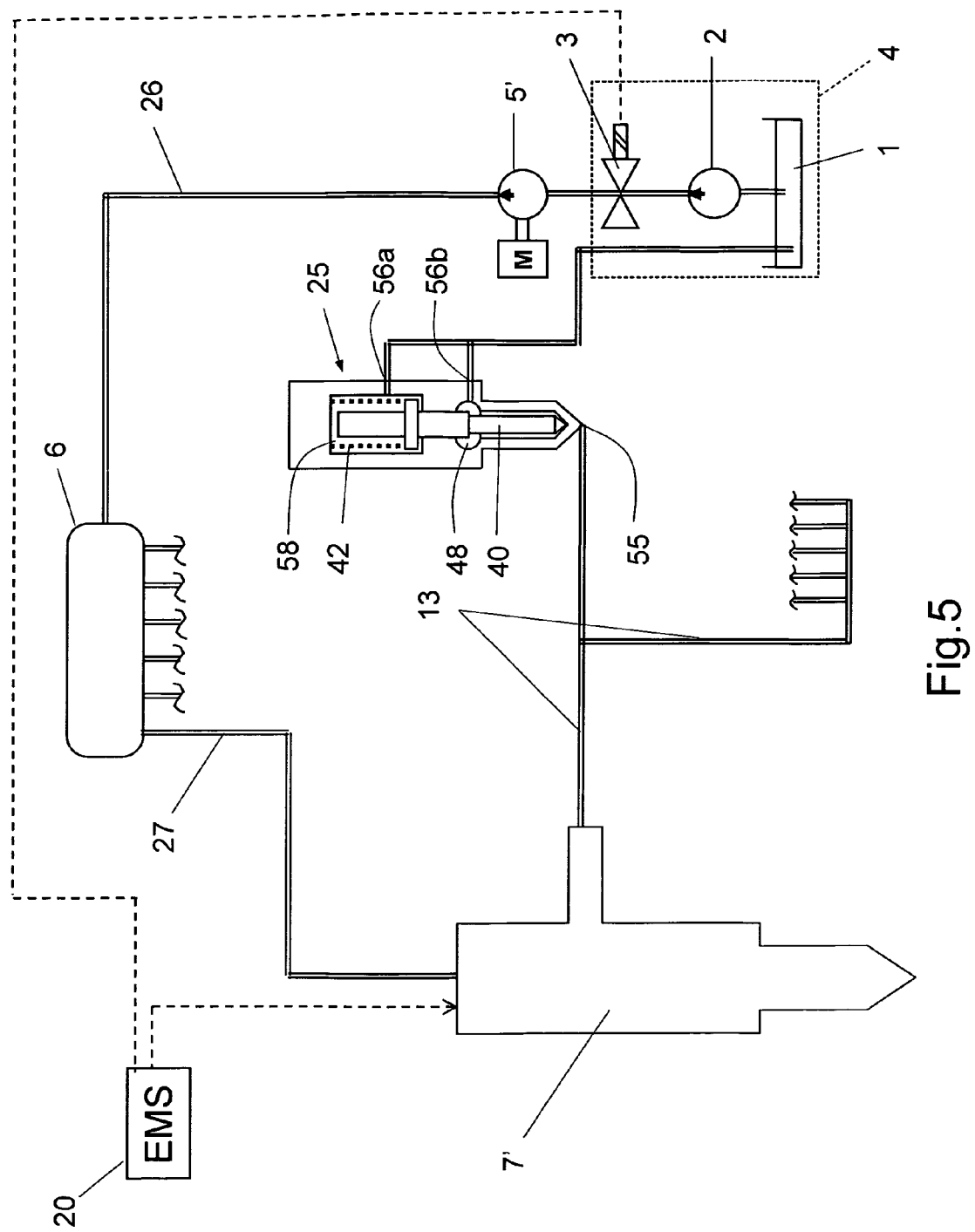
FIG. 5 shows a fuel injection system according to the disclosure.
Figure 6:
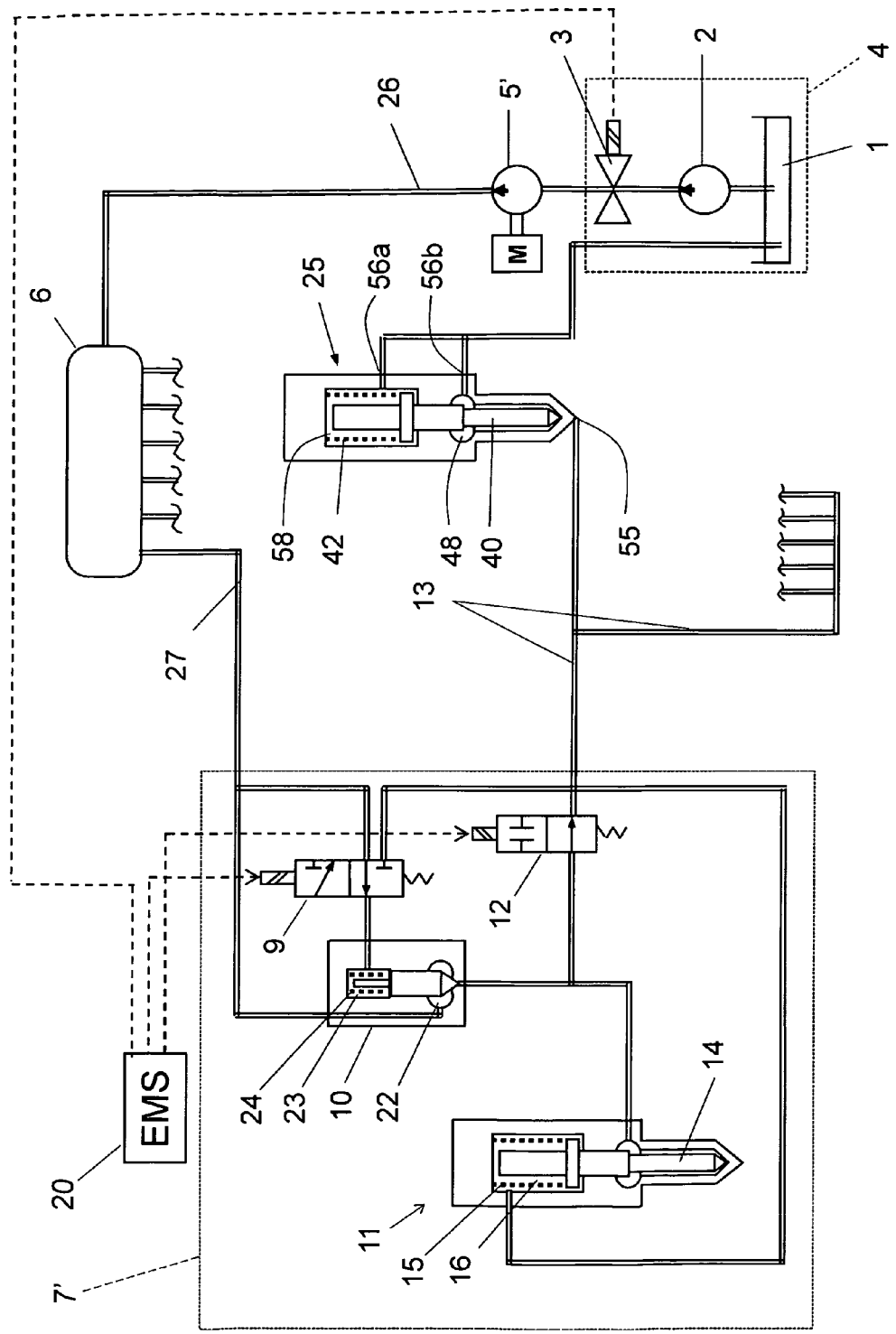
FIG. 6 shows a more detailed version of FIG. 5.
Figure 7:
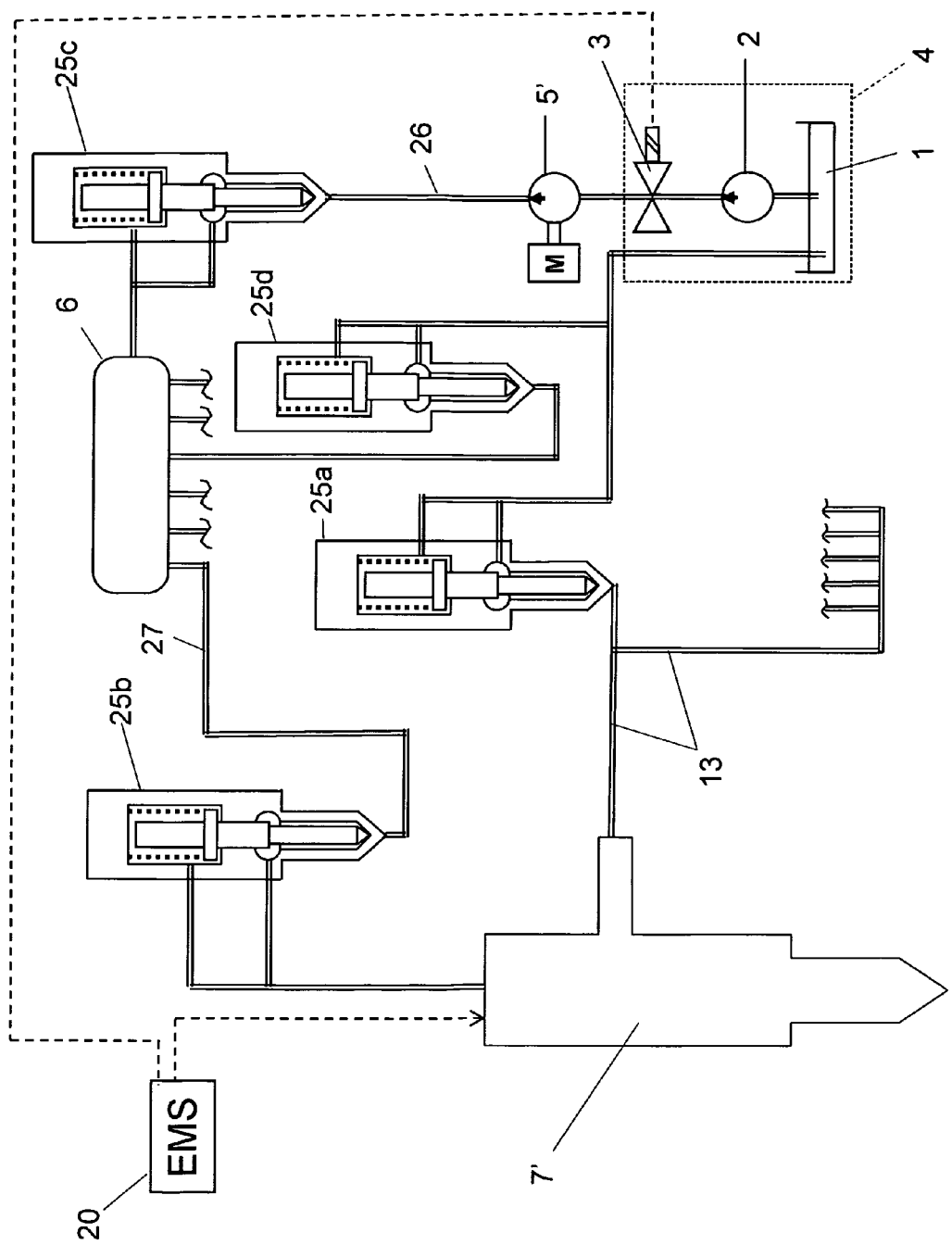
FIG. 7 shows an aspect of the fuel injection system according to the disclosure.

In FIGS. 5-7 of the disclosure the hydraulic system is exemplary implemented as a fuel injection system for an internal combustion engine having at least one combustion cylinder. The hydraulic actuator 7 is thus here represented by a fuel injector T having a fuel injection nozzle 11 for injecting fuel into a combustion cylinder (non-showed). The high pressure fluid source 5 is represented by a high pressure fuel pump 5', the low pressure fuel system 4 comprises a fuel tank 1, a feed pump 2 and an electronically controlled isolating valve 3. The low pressure fluid system 4 comprises components assisting in safe and reliable delivery of fuel from the tank 1 to the fuel injector 7'. The high-pressure fuel pump 5' is arranged to deliver fuel under pressure to a common rail 6 by means of a fuel pump line 26. The common rail 6 subsequently supplies pressurised fuel to all injectors 7 of a multi-cylinder engine (not shown) via individual fuel injector lines 27. The individual return lines 13 of the injectors 7 are connected to the low-pressure fluid system 4. An engine management system 20 controls the operation of the injector 7' and isolating valve 3. The hydraulic valve 25 is located in the return flow between the fuel injector T and flow pressure fluid system 4 for regulating the internal working pressure of the fuel injectors T to a sufficiently high level to avoid vaporisation of the fuel, as well as functioning as automatic isolating valve in a common part the return line 13 to avoid leakage of fuel from the tank 1 to the injectors T at engine stillstand.

FIG. 6 shows the fuel injection system of FIG. 5 with the fuel injector functionality displayed more in detail. The injector T comprises a three-way electrically operated pilot valve 9 that controls a hydraulically operated control valve 10 positioned between the common rail 6 and a conventional diesel fuel injection nozzle 11, and an electrically operated, two-way, normally open spill valve 12 positioned between the outlet of the hydraulically operated control valve 10 and the return line 13. The nozzle 11 has a needle 14 that is biased by a return spring 15 towards closing the nozzle 11. The return spring 15 is installed in a needle chamber 16 of the nozzle 11, which needle chamber 16 is connected to the outlet of the spill valve 12. The outlet of the pilot valve 9 is connected downstream of spill valve 12, and the outlet of the spill valve 12 is connected to the return line 13. The hydraulically operated control valve 10 has an outlet chamber 22 and a control chamber 23, and is preferably biased towards its closed position by a resilient means 24. The control chamber 23 of the control valve 10 can be connected via the three-way pilot valve 9 to either the common rail 6 or the outlet of the spill valve 12, depending on commands from the EMS 20. An engine management system (EMS) 20 controls the three-way pilot valve 9 and spill valve 12. It is referred to document WO2009/110820 for details about the opera on of the injector 7. Both the fuel injection nozzle 11 of the injector T and the more or less modified fuel injection nozzle of the hydraulic valve 25 have a standard diesel fuel injection nozzle design, and both said fuel injection nozzles 11 have preferably a similar or substantially the same design.

FIG. 7 shows the fuel injection system of FIGS. 5 and 6 with a plurality of hydraulic valves 25a, 25b, 25c, 25d included for illustrating how and where the hydraulic valve according the disclosure advantageously can be implemented, similar to the configurations shown in more general hydraulic system layouts of FIGS. 2-4. In FIG. 7, a first hydraulic valve 25a is arranged in the flow path of the return line 13, and preferably in the part of the return line 13 being common for all injectors 7', such that a single control valve 25a can be used for all injectors T of the combustion engine. The purpose of the first control valve 25a is function as a combined automatic isolating valve for preventing leakage to injector T and out into the combustion chamber of the engine at engine stillstand and pressure regulating valve for keeping the operating pressure of the first injector T above a vaporisation pressure of the fuel. A second hydraulic valve 25b is arranged in the fuel injector line 27 between the common rail 6 and fuel injector T. The purpose of the second hydraulic valve 25b is to prevent fuel from the common rail 6 to leak out into the combustion chamber of the engine via the fuel injector 7', and the prevent the pressurised fuel of the common rail to vaporise because the mainly fuel vapour will be injected upon engine starting, resulting in a prolonged engine starting phase because the fuel vapour must be replaced with liquid fuel before engine can be started. A third hydraulic valve 25c is located in the fuel pump line 26 between the high pressure fuel pump 5' and common rail 6. The purpose of the third hydraulic valve partly same as the second hydraulic, valve 25b, namely preventing that the pressurised fuel that is available within the common rail at engine stop does not vaporise. A second purpose is preventing leakage back to high pressure fuel pump 5'. A fourth hydraulic valve 25d functions as a relief valve in that it aims at preventing fuel pressure above a predetermined level to reach the fuel injector 7'. This is realised by selecting suitable return spring strength. A fuel injection system as showed in FIG. 7 may consequently comprise one, two, three or more additional fuel injection nozzles in addition to the fuel injection nozzles of the conventional fuel injectors 7'.

In FIG. 8, a schematic illustration of a version of the hydraulic valve 25 is shown. The hydraulic valve 25 comprises a needle 40 that is slidingly arranged in a cylindrical guide 81 provided in a body 41 and biased to a closed position by a return spring 42. The tip 43 of the needle 40 has a conical shape and cooperates with a preferably conical needle seat 44. When the return spring. 42 biases the needle 40 against the needle seat 44 the valve 25 is closed. One or more holes 45 are provided in the body 41 near the needle seat 44 to enable fluid to reach the contact area of the needle 40 and needle seat 44. When sufficiently large pressure is available upstream the needle seat 44, i.e. in the illustration of FIG. 8 below the needle seat 44 the force of the fluid acts on the surface 46 of the needle tip 43 to urge the needle 40 to open against the closing force of the spring 42. After opening of the hydraulic valve 25 fluid flows past the needle seat 44 and along the needle stem 80 towards the fuel outlet chamber 48 and subsequently further to a fluid outlet 47 of the body 41. In case the pressure level of the received high pressure fluid decreases the spring force will close the valve 25. In the embodiment of the hydraulic valve 25 the outlet chamber 48 is fluidly connected to the needle chamber 58 via the fluid outlet 47 of the body. 41

The needle 40 and body 41 are preferably parts of conventional diesel fuel injection nozzle. The nozzle is here arranged backwards such that the conventional inlet of the nozzle functions as fuel outlet 47, and the conventional fuel outlet of a nozzle function as the fuel inlet 45. A conventional diesel fuel nozzle comprises a fuel delivery chamber 48 to which high-pressure fuel from the common rail 6 is supplied. The delivery chamber 48 is configured such that the fuel pressure within the delivery chamber 48 exerts a force on a thrust surface 49 of the needle 40 for urging the needle 40 away from the needle seat 44. A flow passage 50 connects the delivery chamber 48 with the needle tip 43 to enable high pressure fuel from the delivery chamber 48 and flow passage 50 to be injected into the combustion chamber upon opening of the needle 40. The flow passage 50 is here formed by a radial annular gap formed between the stem 80 of the needle 40 and bore of the body 41. This flow passage 50 extends from the delivery chamber 48 to the needle tip 43. At least one flow passage is generally also provided between the delivery chamber 48 and the axial end side 51 of the nozzle located opposite to the needle seat 44. The delivery chamber 48 is located between the tip 43 of the needle 40 and the axial end side 51 opposite the tip 43. Small holes may be provided in the tip of the body 41. These holes are configured to generate a distributed fuel injection within the combustion chamber when using the nozzle for fuel injection. When using the nozzle as hydraulic valve 25 in a backwards configuration, the small holes may be used as fuel inlet 45.

The tip 43 of the nozzle needle 40 and the nozzle body seat 44 are both made of a very high-strength and wear-resistant material, and the machining of the cylindrical guide 81 and the corresponding cylindrical surface of the needle, as well as the concentricity of the nozzle needle and nozzle body is generally of such a high quality for fuel injection nozzles that hydraulic valve is provided with excellent long-term sealing properties.

A housing 53 is provided for assembling the nozzle needle 40, nozzle body 41 and return spring 42 to a unit. The spring 42 is arranged to act upon an axial side of the needle 40 and the interior surface of the housing 53. The housing 53 may be made of metal material, such as steep, and can be made in two parts 53a, 53b that can be fastened to each other after having secured to the needle 40 and body 41 therein. The housing 53 consequently comprises an internal cylindrical bore that is dimensioned to receive the cylindrical nozzle body 41. The two parts 53a, 53b of the housing 53 may be joined to each other in a common contact region 54 by any suitable mechanical fastening means, such as threads or clamping means, or by adhesive or welding, etc. An inlet 55 is provided in the housing 53 for enabling fluid to reach the tip 43 of the needle 40, and a fuel outlet 56a is provided in the housing 53 for enabling fluid has travelled past the needle seat 44, via the flow passage 50 and outlet 47 to flow to the tank 1. The design of the housing 53 is merely an example out of many different designs that are possible.

FIG. 9 shown an alternatively design of the hydraulic valve 25, where the injector nozzle has been slightly modified to better suit the new use as hydraulic valve arranged in a backwards flow configuration. The most advantageous aspects of the injector nozzle, such as the very accurate and concentric guidance of the needle 40 in the body 41 and the excellent machined sealing contact between the needle 40 and needle seat 44 are maintained, but the low flow capacity of the nozzle has been improved by cutting of the sac 52 of the body 41 to enable an increased flow area. The body 41 may for example exhibit a single hole 45 having a diameter greater than 1 mm at the entrance to the valve seat 44. Furthermore, the bore 82 of the body 41 may be enlarged to enable increased flow passage 50 connecting the outlet chamber 48 and the needle tip 43, and the passage connecting the outlet chamber 48 and fluid outlet 47 may also be enlarged, and additional passages (non-showed) may possibly be provided between the outlet chamber 48 and fluid outlet 47.

FIG. 10 shows a hydraulic valve according to the disclosure where the outlet chamber 48 is connected to an individual fluid outlet 56b and the needle chamber 58 being connected to another individual fluid outlet 56a. This configuration is advantageous because it enables more options in terms of control of the opening criteria of the needle. For example, the needle chamber may be connected to the return line 13 upstream of the hydraulic valve 25 and the outlet chamber may be connected to the low pressure fluid system 4. Thereby a completely different operating characteristic of the hydraulic valve can be accomplished.

FIG. 11 shows an example of the shape of the needle seat 44 and needle tip 43. The tip of the body 41 may interiorly exhibit a conical shape with a constant truncation angle. The needle tip 43 may exhibit three regions, each having a different truncation angle, where a first region located closest to the end of the tip 43 exhibits a truncation angle 59 greater than 140 degrees. The second region ranging between truncation diameter L2 and L3 has a smaller truncation angle than the first region. The third region ranging between truncation diameter L1 and L2 has a smaller truncation angle than the second region, such that the needle tip comprises an increasingly truncated shape towards the end of the tip, where the truncation angle increases in discrete steps. The truncation angle of the corresponding surface of the body 41 being selected approximately inbetween two consecutive truncation angles of the needle tip 43 to obtain a very precise and well-defined contact surface between the needle 40 and needle seat 44. The diameter D1 of the cylindrical guide 81 is larger than the diameter L2 of the nozzle seat 43. The truncation diameter L3 of a tip 43 of the needle 40 is preferably greater than 85% of the seat diameter L2. The shortest distance D2 between the cylindrical guide 81 and the needle seat 43 is preferably at least ten times the needle seat diameter L2.

As will be realised, the disclosure is capable of modification in various obvious respects, all without departing from the scope of the appended claims. For example, the hydraulic system may have a much more complex layout comprising much more hydraulic components than illustrated in the schematic and simplified drawings 2-4. The hydraulic system and its advantages have been largely described having, the hydraulic actuator as a fuel injector in a fuel injection system but the hydraulic system according to the disclosure may be suitable for many other implementations, in particular small and fast operating hydraulic control systems but also larger hydraulic systems such as motion control system comprising for example piston-based hydraulic actuators or the like. Accordingly, the drawings and the description thereto are to be regarded as illustrative in nature, and not restrictive.

The invention claimed is:

1. A hydraulic system comprising a high pressure fluid source and a hydraulic actuator fluidly connected to the high pressure fluid source, and a low pressure fluid system fluidly connected to the hydraulic actuator via a fluid return line, and a hydraulic valve,
   wherein the hydraulic valve comprises a return spring and an elongate member, which is movably arranged in its longitudinal direction for controlling a fluid flow,
   wherein the elongate member is biased to a closed position by means of the return spring,
   wherein the elongate member forms a needle, the hydraulic valve comprises needle receiving body having a needle seat, and the needle is engageable with the needle seat so as to control the fluid flow,
   wherein the needle receiving body comprises an internal bore forming a cylindrical guide for axially guiding the needle within the needle receiving body, the cylindrical guide is located at a distance from the needle seat, and an outlet chamber is provided between the needle seat and the cylindrical guide;
   the hydraulic valve comprises a valve housing for receiving the needle and needle receiving body; and
   the valve housing comprises a fluid inlet configured to supply fluid to the contact region of the needle and needle seat for urging the needle away from the needle seat, the cylindrical guide forms part of a needle chamber, which is located on the side of the cylindrical guide opposite to the outlet chamber, wherein the hydraulic valve comprise two outlets: a first fluid outlet fluidly connected to the outlet chamber and a second fluid outlet (56*a*) fluidly connected to the needle chamber.

2. Hydraulic system according to claim 1, wherein the hydraulic system is a fuel injection system for an internal combustion engine having at least one combustion cylinder, the actuator is a fuel injector having a fuel injection nozzle for injecting fuel into the combustion cylinder, the high pressure fluid source is a high pressure fuel pump, the low pressure fuel system comprises a fuel tank, and the needle is engageable with the needle seat so as to control the fuel flow.

3. Hydraulic system according to claim 1, wherein engaging surface of the needle and the needle seat are conically shaped.

4. Hydraulic system according to claim 1, wherein the needle comprises at least one thrust surface configured to be subjected to a fluid pressure for urging the needle away from the needle seat.

5. Hydraulic system according to claim 1, wherein engaging surfaces of the needle and the needle seat comprises metal for a metal to metal contact in the closed position of the hydraulic valve.

6. Hydraulic system according to claim 1, wherein the needle chamber and the outlet chamber are fluidly connected to each other.

7. A hydraulic system according to claim 1, wherein the diametric clearance between the cylindrical guide and needle is less than 5 micrometers for accomplishing a certain level of sealing performance along the cylindrical guide.

8. A hydraulic system according to claim 1, wherein an additional seal is provided along the cylindrical guide for further enhancing the sealing performance along the cylindrical guide.

9. A hydraulic system according to claim 1, wherein the diameter of the cylindrical guide is larger than the diameter of the nozzle seat.

10. A hydraulic system according to claim 1, wherein the needle receiving body comprises a single hole (45) having a diameter greater than 1 mm upstream of the needle seat.

11. A hydraulic system according to claim 1, wherein a truncation diameter of a tip of the needle is greater than 85% of the seat diameter.

12. A hydraulic system according to claim 1, wherein a truncation angle of a tip of the needle is greater than 140 degrees.

13. A hydraulic system according to claim 1, wherein the shortest distance between the cylindrical guide and the needle seat is at least ten times the needle seat diameter (L2).

14. Hydraulic system according to claim 1, wherein hydraulic valve is a standard injection nozzle-based valve.

15. Hydraulic system according to claim 14, wherein the fuel injection nozzle comprises an inlet, an outlet, and the fuel injection nozzle is fluidly connected such that the pressure of the fluid supplied via the inlet of the fuel injection nozzle to the tip of the needle urges the needle away from the needle seat to open the nozzle.

16. Hydraulic system according to claim 1, wherein the valve housing is made of plastic or metal material and comprises at least two main parts that are configured to enclose the needle and needle receiving body.

17. Hydraulic system according to claim 1, wherein the valve housing is integrated with a housing of the actuator to form a common housing containing the actuator and the hydraulic valve.

18. Hydraulic system according to claim 1, wherein the hydraulic valve is arranged to operate as pressure relief valve, non-return valve or pressure-isolating valve.

19. Hydraulic system according to claim 1, wherein an inlet of the hydraulic valve is connected to the high pressure fluid source and an outlet of the hydraulic valve is connected upstream of the actuator for preventing backflow of fluid towards the high pressure fluid source.

20. Hydraulic system according to claim 1, wherein an inlet of the hydraulic valve is connected upstream of the actuator and an outlet of the hydraulic valve to the return line or the low pressure fluid system for limiting the pressure of the fluid supplied to the actuator.

21. Hydraulic system according to claim 1, wherein an inlet of the hydraulic valve is connected to an outlet of the actuator and an outlet of the hydraulic valve is connected to the return line or the low pressure fluid system for regulating the operating pressure upstream of the hydraulic valve and/or preventing backflow of fluid towards the actuator.

22. Hydraulic system according to claim 1, wherein the needle chamber is connected to atmosphere.

23. Hydraulic system according to claim 1, wherein the needle chamber is connected to the low pressure fluid system.

24. Hydraulic system according to claim 2, wherein the fuel injection system further comprising a common fuel rail, a fuel pump line connecting the high pressure fuel pump and common fuel rail and configured to deliver fuel from the fuel tank to the common fuel rail.

25. Hydraulic system according to claim 24, wherein the fuel injection system further comprises a fuel injector line connecting the common fuel rail with the fuel injector and configured to supply relatively high-pressure fuel to the fuel injection nozzle, and a control valve for controlling the fuel flow from the common fuel rail to the fuel injection nozzle.

26. Hydraulic system according to claim 2, wherein the fuel injection system further comprises an engine management system which is configured to control the control valve, a spill valve operated by the engine management system and connected by its inlet to an outlet of the control valve and by its outlet to the return line.

27. Hydraulic system according to claim 2, wherein the fuel injection system comprises a plurality of fuel injectors for a multi-cylinder engine, and the hydraulic valve (25, 25a-d) is located in a part of the return line that is common for all fuel injectors.

28. Hydraulic system according to claim 2, wherein the fuel return line connects the fuel injector with fuel tank.

29. A hydraulic system comprising a high pressure fluid source and a hydraulic actuator fluidly connected to the high pressure fluid source, and a low pressure fluid system fluidly connected to the hydraulic actuator via a fluid return line, and a hydraulic valve, wherein the hydraulic valve comprises a return spring and an elongate member, which is movably arranged in its longitudinal direction for controlling a fluid flow, and wherein the elongate member is biased to a closed position by means of the return spring, wherein the elongate member forms a needle, that the hydraulic valve comprises needle receiving body having a needle seat, and that the needle is engageable with the needle seat so as to control the fluid flow, wherein the hydraulic valve comprises a valve housing for receiving the needle and needle receiving body, and wherein the valve housing comprises a fluid inlet configured to supply fluid to the contact region of the needle and needle seat for urging the needle away from the needle seat, wherein hydraulic valve is a standard injection nozzle based valve, preferably a standard diesel fuel injection nozzle.

30. A hydraulic system according to claim 29, wherein the needle receiving body comprises a single hole having a diameter greater than 1 mm upstream of the needle seat.

31. A vehicle comprising a hydraulic system according to claim 1.

* * * * *